US009503789B2

(12) United States Patent
Goode

(10) Patent No.: US 9,503,789 B2
(45) Date of Patent: Nov. 22, 2016

(54) CUSTOMIZED USER INTERFACE GENERATION IN A VIDEO ON DEMAND ENVIRONMENT

(75) Inventor: Christopher W. B. Goode, Menlo Park, CA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 2907 days.

(21) Appl. No.: 09/922,242

(22) Filed: Aug. 3, 2001

(65) Prior Publication Data

US 2002/0016961 A1 Feb. 7, 2002

Related U.S. Application Data

(60) Provisional application No. 60/222,784, filed on Aug. 3, 2000.

(51) Int. Cl.
| | | |
|---|---|---|
| *H04N 21/4725* | (2011.01) | |
| *H04N 21/234* | (2011.01) | |
| *H04N 21/258* | (2011.01) | |
| *H04N 21/4722* | (2011.01) | |
| *H04N 21/81* | (2011.01) | |
| *H04N 7/173* | (2011.01) | |
| *H04N 21/218* | (2011.01) | |
| *H04N 21/238* | (2011.01) | |
| *H04N 21/84* | (2011.01) | |

(52) U.S. Cl.
CPC .......... *H04N 21/4725* (2013.01); *H04N 7/173* (2013.01); *H04N 21/218* (2013.01); *H04N 21/23424* (2013.01); *H04N 21/23805* (2013.01); *H04N 21/25883* (2013.01); *H04N 21/4722* (2013.01); *H04N 21/812* (2013.01); *H04N 21/84* (2013.01)

(58) Field of Classification Search
CPC ................. H04N 21/23424; H04N 21/44016; H04N 21/812; H04N 21/4312; H04N 21/482; H04N 21/478; H04N 21/4316; H04N 21/4622; H04N 21/47214; H04N 21/84; H04N 21/4821
USPC ............ 375/240.12–240.16, 240.03; 725/54, 725/34, 36, 35, 37–43, 47
See application file for complete search history.

(56) References Cited

U.S. PATENT DOCUMENTS

| | | | | |
|---|---|---|---|---|
| 5,963,222 A | * | 10/1999 | Cheney | H04N 21/4435 345/555 |
| 6,118,486 A | * | 9/2000 | Reitmeier | H04N 21/4383 348/435.1 |
| 6,584,153 B1 | * | 6/2003 | Comito et al. | 375/240.13 |
| 6,675,387 B1 | * | 1/2004 | Boucher et al. | 725/105 |

(Continued)

FOREIGN PATENT DOCUMENTS

| | | | | |
|---|---|---|---|---|
| WO | WO 0064170 | * | 10/2000 | H04N 7/14 |
| WO | WO 0131914 A1 | * | 5/2001 | H04N 5/445 |

OTHER PUBLICATIONS

Diidier Le Gall—"MPEG: A Video Compression Standard for Multimedia Applications"; Indications of the ACM, Apr. 1991/vol. 34; No. 4.*

*Primary Examiner* — Hai V Tran
(74) *Attorney, Agent, or Firm* — Merchant & Gould

(57) ABSTRACT

A method for delivering customized navigation or interactive program guide imagery to a user by digitally splicing bitstreams bearing graphics or video imagery and bitstreams bearing navigation or IPG imagery. The resulting combined bitstream is delivered to a user or viewer.

21 Claims, 6 Drawing Sheets

(56) References Cited

U.S. PATENT DOCUMENTS

| | | | |
|---|---|---|---|
| 6,873,368 B1* | 3/2005 | Yu | H04N 21/23436 348/385.1 |
| 7,394,850 B1* | 7/2008 | Gordon | 375/240.01 |
| 2003/0028879 A1* | 2/2003 | Gordon et al. | 725/39 |
| 2005/0018916 A1* | 1/2005 | Kondo | 382/238 |

* cited by examiner

CUSTOMIZED USER INTERFACE GENERATION IN A VIDEO ON DEMAND ENVIRONMENT

CROSS-REFERENCES TO RELATED APPLICATIONS

This application claims benefit of U.S. Provisional Patent Application Ser. No. 60/222,784 filed Aug. 3, 2000 which is hereby incorporated by reference in its entirety.

BACKGROUND OF THE INVENTION

The invention relates generally to digital video processing and more specifically to a method and apparatus for inserting a compressed digital advertisement video into a compressed digital program video.

As television transmission systems switch to compressed digital formats, the need to insert advertisement using a "digital-into-digital" process arises. The digital-into-digital process achieves ad insertion by switching between compressed advertisement and program video streams and broadcasting the multiplexed output video stream to the viewer. Conventional solutions for the digital-into-digital process, however, are fraught with problems since video compression schemes such as the ones defined by the Moving Pictures Expert Group (MPEG) standard focuses mainly on the relationships between frames of video and packets of audio.

Splicing in the compressed digital domain to achieve ad insertion generally cannot be accomplished with the same degree of freedom as in the analog domain or in the uncompressed digital domain. The profile (or characteristics, which typically include the bit rate) of a compressed video stream continually changes over time depending on the contents of the video, the parameter values used to encode the video, and other factors. Unless care is taken to ensure that the splicing is accomplished at the proper points within the compressed video stream and with matched encoding profiles for the compressed streams to be merged, various unsightly artifacts or other anomalies can result in the multiplexed output video. Such artifacts and anomalies may include, for example, severe macroblocking, dropped frames, macroblock panics, audio glitches, pop gargling noises, drop outs, and so on.

SUMMARY OF THE INVENTION

The invention provides for advertising insertion within the context of a navigator or interactive program guide (IPG) such that the viewer or user receives a customized or targeted advertisement while interacting with an information distribution system such as a video on demand (VOD) system. A navigator screen comprising a video layer, a graphics layer and a control layer may include targeted advertisement within one or both of the video layer and graphics layer.

The included advertisement may be still or moving imagery, such as bit map graphics, still images, moving images such as movie trailers and the like. Selection of a video or graphic object associated with an advertisement contextually routes the user or viewer to the advertised product or service. In one embodiment, a graphics layer object obscures a still or moving image advertisement within the video layer such that a user may only view the advertisement by selecting the obscuring graphic layer object. In this manner, user interaction may be recorded at a head-end.

A method according to the invention for delivering customized navigation imagery to a user comprises: determining a profile associated with an encoded navigation stream, the profile including spatial and temporal parameters; encoding a video stream according to the profile to produce an encoded video stream, the encoded video stream representing imagery having associated with it a screen position and an image size; combining the encoded navigation stream and the encoded video stream to produce a combined stream representing navigation imagery including the video stream imagery within the screen position and according to the screen size.

BRIEF DESCRIPTION OF THE DRAWINGS

The teachings of the invention can be readily understood by considering the following detailed description in conjunction with the accompanying drawings.

DESCRIPTION OF THE SPECIFIC EMBODIMENTS

Figure 1:
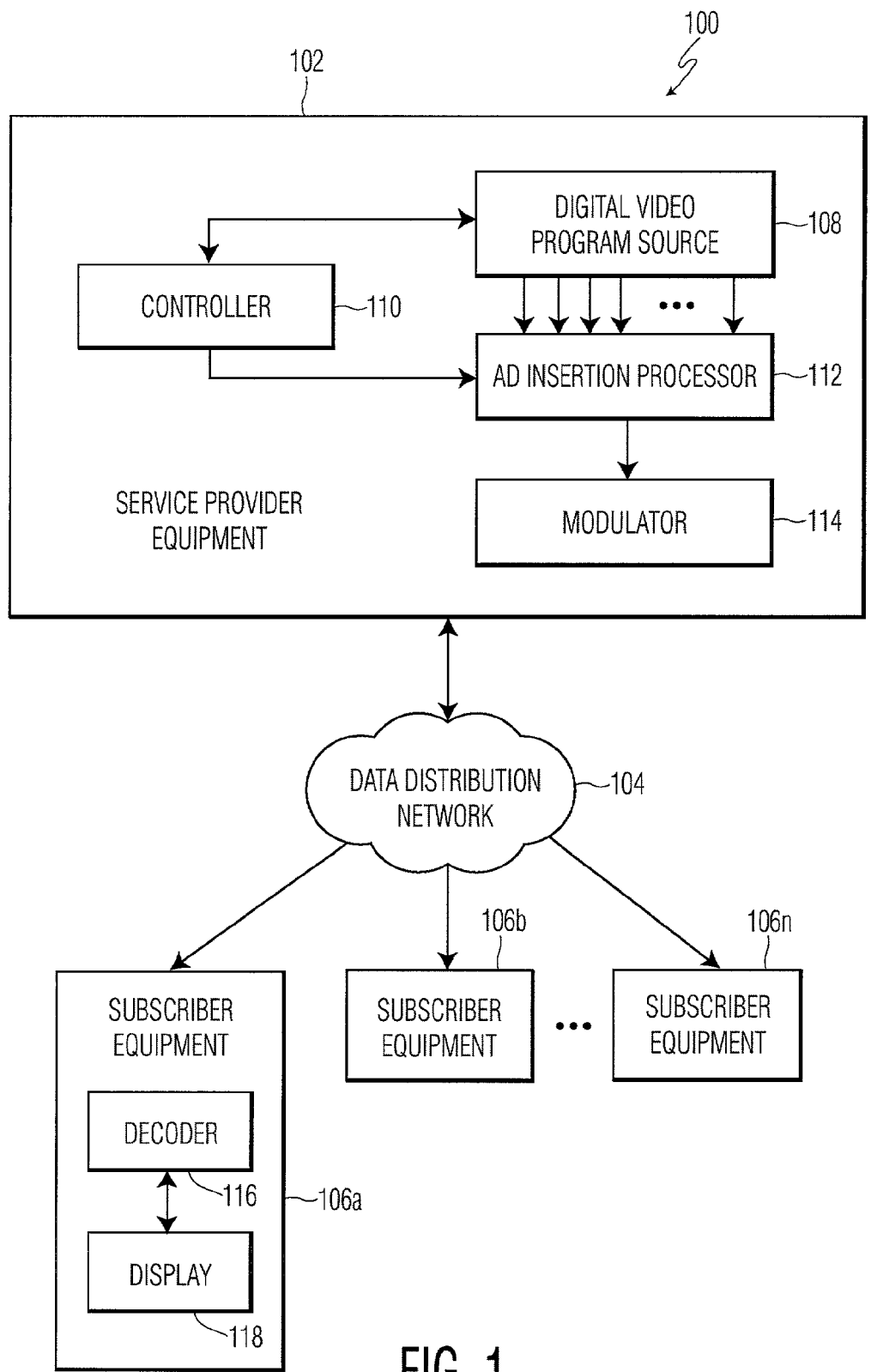
FIG. 1 depicts a block diagram of a digital information distribution system capable of implementing various aspects of the invention.

FIG. 1 depicts a block diagram of a digital information distribution system 100 capable of implementing various aspects of the invention. System 100 includes service provider equipment 102, a data distribution network 104, and subscriber equipment 106. In an embodiment, service provider equipment 102 includes a digital program video source 108 (which may be implemented with a video server), a controller 110, an ad insertion processor 112, and a modulator 114 (which may be implemented as a quadrature amplitude modulation (QAM) modulator). Service provider equipment 102 couples to data distribution network 104, which may be a hybrid fiber-coax network. Subscriber equipment 106 also couples to network 104 and includes a video decoder 116 (e.g., an MPEG decoder) and a display device 118 (e.g., a television set).

Digital program video source 108 provides a number of streams of compressed digital program video to ad insertion processor 112. As used herein, the term "compressed digital program video" or "compressed video" includes the associated digital audio information, which may or may not be compressed. The compressed program video streams from source 108 may be MPEG-compliant streams. However, streams produced using other encoding schemes can also be processed in accordance with the techniques of the invention.

Ad insertion processor 112 generates a number of compressed advertisement video streams, inserts the compressed advertisement video streams into the compressed program video streams, and provides one or more output video streams to modulator 114. Modulator 114 then modulates the output video streams onto one or more carriers, and the modulated signals are transmitted via data distribution network 104 to subscriber equipment 106. Subscriber equipment 106 demodulates the signal, decodes a selected video stream using video decoder 116, and provides the decoded video to display 118.

Ad insertion processor 112 provides a seamless transition between the compressed program video that is distributed to the subscribers and the compressed advertisement video that is inserted into the compressed program video, and is described in further detail below. Controller 110 provides the control signals for the insertion of the compressed advertisement video into the compressed program video.

Figure 2:
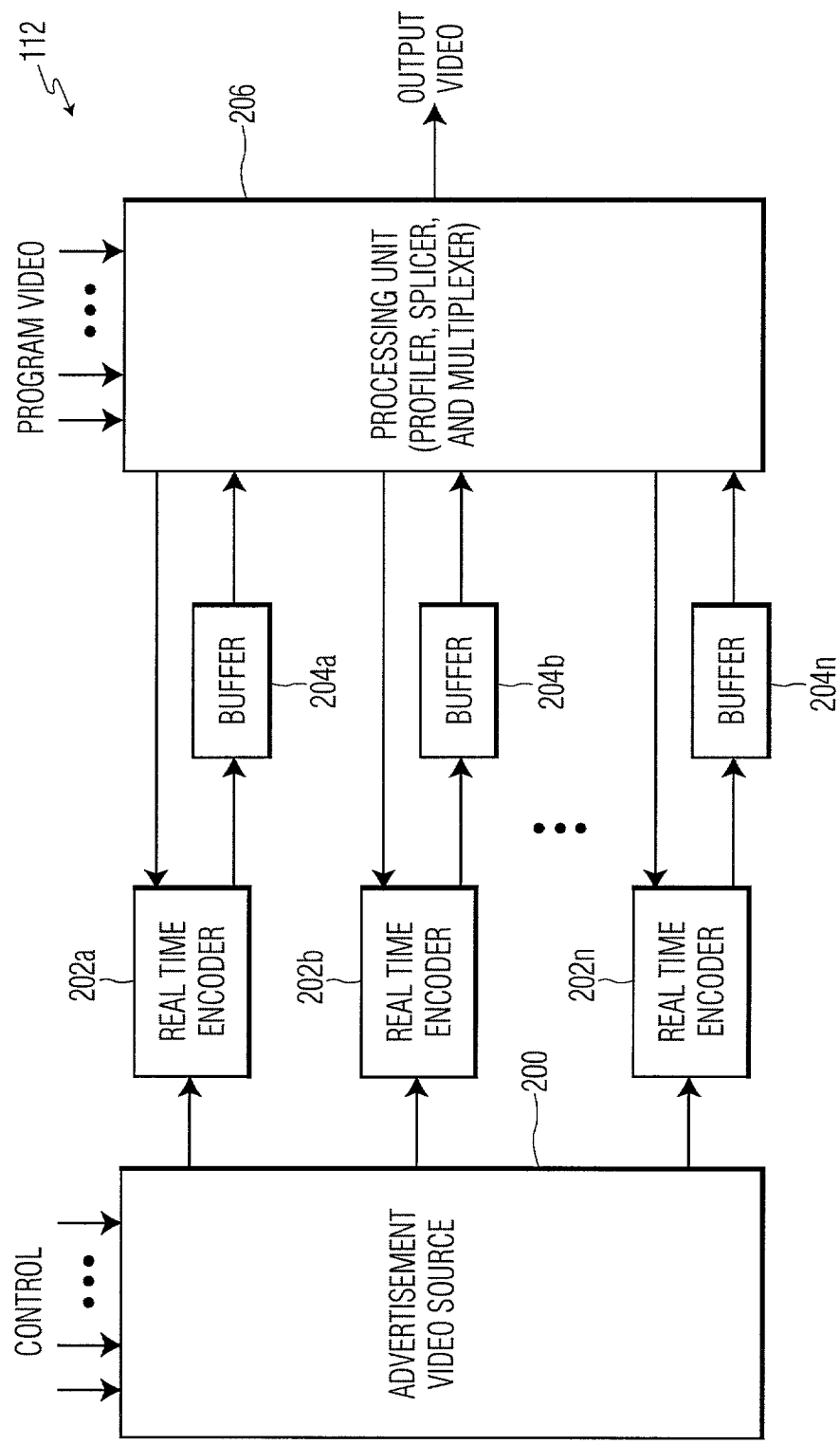
FIG. 2 depicts a block diagram of an embodiment of an ad insertion processor in accordance with an embodiment of the invention.

FIG. 2 depicts a block diagram of an embodiment of ad insertion processor 112. In this embodiment, ad insertion processor 112 includes an advertisement video source 200, a number of real time (one or more) encoders 202, a number (one or more) of buffers 204, and a processing unit 206. In an embodiment, processing unit 206 includes a profiler, a splicer, and a multiplexer.

Advertisement video source 200 provides the advertisements to be inserted into the program videos. Advertisement video source 200 may be implemented with a server coupled to a bulk storage device (e.g., a disk drive, magneto-optical drive, or some other storage device) used to store a large number of advertisements that can be selectively retrieved. The stored advertisements may be in a particular format and may conform to, for example, the CCIR-601 video standard. Advertisement video source 200 receives from controller 110 control information identifying when an advertisement should be inserted into the compressed program video stream, and uses the control information to initiate the processing (e.g., encoding) of the advertisement. At the designated times, the selected advertisements are streamed out of advertisement video source 200 to the assigned real time encoders 202 on a frame-by-frame or sub-frame (slice) basis.

Each real time encoder 202 may be assigned to encode a particular advertisement video from advertisement video source 200 or any number of encoders (e.g. two) can be used to encode the advertisement videos where each advertisement video time-shares the available encoders. Real time encoders 202 then provide the compressed advertisement video streams to respective buffers 204, which buffer the compressed streams until they are needed.

Processing unit 206 receives a number of compressed program video streams (e.g., from program video source 108). For each compressed program video stream to be inserted with advertisements, the profiler within processing unit 206 provides a profile for the compressed stream. Processing unit 206 further receives compressed advertisement video streams from buffers 204 and inserts the advertisements into the proper program videos.

Figure 3:
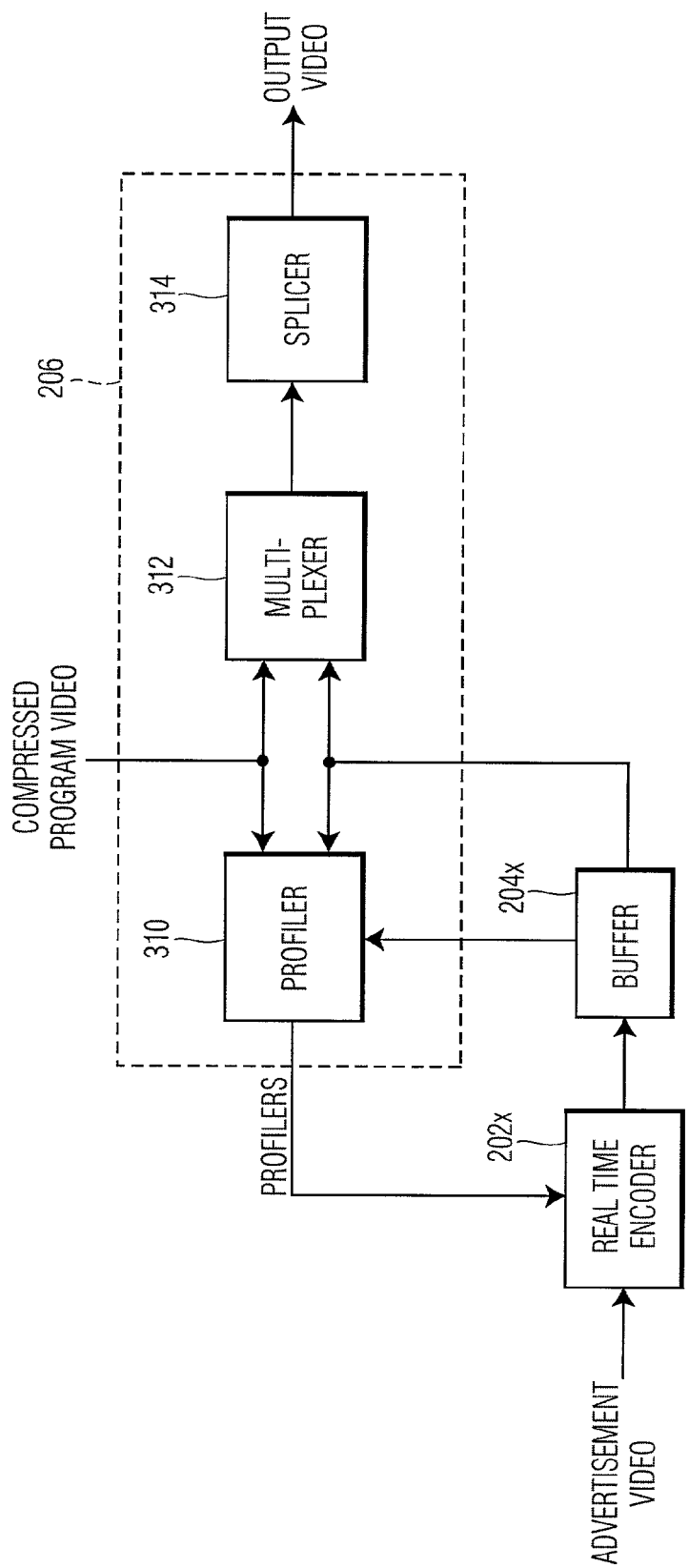
FIG. 3 is a more detailed block diagram of an embodiment of a portion of the ad insertion processor of FIG. 2, which can be used to splice an advertisement video into a program video.

FIG. 3 is a more detailed block diagram of an embodiment of a portion of ad insertion processor 112, which is used to splice an advertisement video into a compressed program video stream. As shown in FIG. 3, the compressed program video is provided to a profiler 310 and a multiplexer 312 within processing unit 206.

Profiler 310 provides information regarding the profile of the compressed program video stream. This profile typically comprises information pertaining to various parameters associated with the compressed stream such as, for example, bit rate information, VBV (video buffering verifier) buffer information that is typically used for MPEG encoding, intra DC coefficient precision, group of pictures (GOP) prediction format, and so on. The bit rate information may include, for example, a high bit rate value, a low bit rate value, and a mean bit rate value for the compressed stream. As used herein, the term "profile" includes the context represented by "levels" in MPEG standard and it is not bound to the defined profile & level definitions and combinations used in MPEG standard. In general, a number of parameters are selected as representative of the program video stream encoding scheme and these parameters are continuously tracked by the profiler 310 for any instant parameter changes in the program bitstream. The profile information for the compressed program video is provided (i.e., fed back) to a real time encoder $202x$ assigned to encode the advertisement video to be inserted into that program video.

The profiler further collects information regarding the profile of the compressed advertisement video such that the encoding parameters for the advertisement can be adjusted to ensure that the profile of the compressed advertisement video is similar to that of the compressed program video at the time the program video was interrupted to insert the advertisement video. In this manner, the transition back to the compressed program video from the compressed advertisement video will also be seamless.

As shown in FIG. 3, real time encoder $202x$ encodes the advertisement video in accordance with a particular encoding scheme to generate the compressed advertisement video stream. Real time encoder $202x$ may be implemented as an MPEG-2 encoder that generates an MPEG-compliant stream. Alternatively, real time encoder 202 may be designed to encode the advertisement video using some other encoding scheme. Typically, real time encoder $202x$ implements the same encoding scheme used to generate the compressed program video stream.

The encoding of the advertisement can begin a particular "pre-roll" time period (e.g., six seconds) prior to the time the advertisement is to be inserted into the compressed program video. The encoding start time can be indicated by a "pre-roll" signal that is received by controller 110 and which indicates that the advertisement will be needed in approximately that pre-roll time period (e.g., in six seconds). Controller 110 then notifies ad insertion processor 112 to produce the compressed advertisement video within that pre-roll time period. Thus, upon receiving the pre-roll signal, advertisement video source 200 can begin streaming frames or slices of the advertisement video to the assigned real time encoder $202x$, which compresses the advertisement.

The encoding is typically initiated a short time (e.g., the pre-roll time) prior to the time at which the compressed video stream will be needed. This allows the real time encoder a sufficient amount of time to adjust the encoding parameters and then encode the advertising content.

The compressed advertisement video stream is then provided to an associated buffer $204x$, which buffers the compressed advertisement video for that pre-roll time period (e.g., six seconds). If real time encoder $202x$ is capable of rapidly encoding video, buffer $204x$ may not be needed and, in that case, encoder $202x$ may be coupled directly to multiplexer 312 within processing unit 206.

In an implementation, a "roll" signal by controller 110 informs that the advertisement is to be inserted into the program video in a particular roll time period (e.g., one second). If buffer $204x$ is not employed, encoder $202x$ can begin encoding the advertisement video at this time and directly provide the compressed advertisement video stream to multiplexer 312.

At the specific point in time the compressed advertisement video is to be inserted into the compressed program video, multiplexer 312 switches from the compressed program video stream to the compressed advertisement video stream. Splicer 314 then splices the compressed advertisement video stream to the compressed program video stream to generate a compressed output video stream.

Prior to the time the advertisement video is inserted into the compressed program video stream, the profiling information that characterizes the compressed program video is provided (i.e., fed back) to real time encoder 202x used to encode the advertisement video for this program video. The profile is then used to adjust the encoder parameters to ensure that the profile of the compressed advertisement video approximately matches the profile of the compressed program video at the point when multiplexer 312 switches stream and the compressed advertisement video is inserted into the compressed program video. Since the advertisement video has been compressed to ensure that the profile of the compressed advertisement video stream is similar to that of the compressed program video stream, the insertion of the advertisement into the program video appears seamless.

Various encoding parameters for the advertisement video can be adjusted based on the profile of the compressed program video. For example, the quantization step size used in the encoding process can be adjusted to achieve the desired profile. The quantization step size can be decreased if a higher bit rate is needed and can be increased if a lower bit rate is required. The VBV buffer information can also be used in the encoding process to ensure that the multiplexed output video stream will not cause buffer overflow or underflow at the decoder. These adjustments of the encoding process are known in the art and not described in further detail herein.

The contents of the program video may be very different from that of the advertisement video and this may result in a difference in picture quality (as measured by the signal-to-noise ratio) for the same profile. In an embodiment, for a particular period of time (e.g., several seconds) near a splicing point, the quality of the advertisement video can be matched to that of the program video. This matching of the picture quality of the two videos to be spliced can be achieved by adjusting the profile parameters.

In an embodiment, while the compressed advertisement video is streamed to multiplexer 312 (after the advertisement video has been spliced to the program video stream), profiler 310 collects profile parameter information according to which the encoding parameters are adjusted. Profile parameters such as the instantaneous bit rate of the advertising video stream are adjusted so that the profile parameter values closely matches program video parameters at the time the program video was interrupted. This is particularly important at the time the advertising video ends and is transitioned back to program video. The use of the profile to continuously adjust the encoding parameters of the advertisement video ensures that the splicing of the program video back into the advertisement appears seamless.

A number of advertisements may be inserted sequentially into the program video using the techniques described above. In an embodiment, the advertisements may be encoded one after another using a number of real time encoders 202 that may be arranged in a cascade configuration. Each advertisement may be encoded based on the profile obtained for the program video into which the advertisement is to be inserted. Multiplexer 312 can switch from one encoded advertisement video stream to another until all advertisements have been inserted. At the end of the advertisements, multiplexer 312 switches back to the compressed program video stream. The profile of the compressed program video is used to adjust the encoder parameters for the advertisements and to ensure that the last advertisement to be encoded has a profile that approximately matches the profile of the compressed program video at the point in time the program video was paused to insert the first advertisement. In this manner, the advertisement videos can be seamlessly inserted into the program video. In addition to the last advertisement video, the first advertisement video may also be encoded with the same profile as the compressed program video to provide seamless transition.

In an alternative embodiment, the advertisements may be encoded one after another using only one real time encoder 202. Again, the encoding of each advertisement can be controlled based on the profile of the compressed program video to ensure a seamless transition between the advertisements and the program video.

Because the profile of the compressed program video stream was used to encode the advertisements inserted into the program video, the decoder within the subscriber equipment is able to properly decode the multiplexed output video stream without producing artifacts and anomalies on the video display. Since the profile of the inserted advertisement is similar to that of the program video, the decoding parameters and the decoder buffer are well behaved (e.g., no buffer overflow). Thus, the decoder can seamlessly transition from decoding the compressed program video stream to decoding the compressed advertisement video stream.

In the above description, the program video is received in compressed form and the advertisement video is encoded based on the profile of the compressed program video. In other embodiments, the program video can also be received in uncompressed form. In this case, the program video can be encoded in the normal manner and the profile for the advertising video can be generated as described above.

For clarity, various aspects of the invention are described for insertion of advertisement video into program video. The techniques described herein can also be adapted for encoding and inserting (i.e., splicing) any types of video or other source materials (e.g., audio, and so on). Moreover, the techniques described herein can be used to splice together compressed streams for portions of frames of videos (e.g., to splice a first compressed stream for the upper half of the frame with a second compressed stream for the lower half of the frame).

Figure 4:
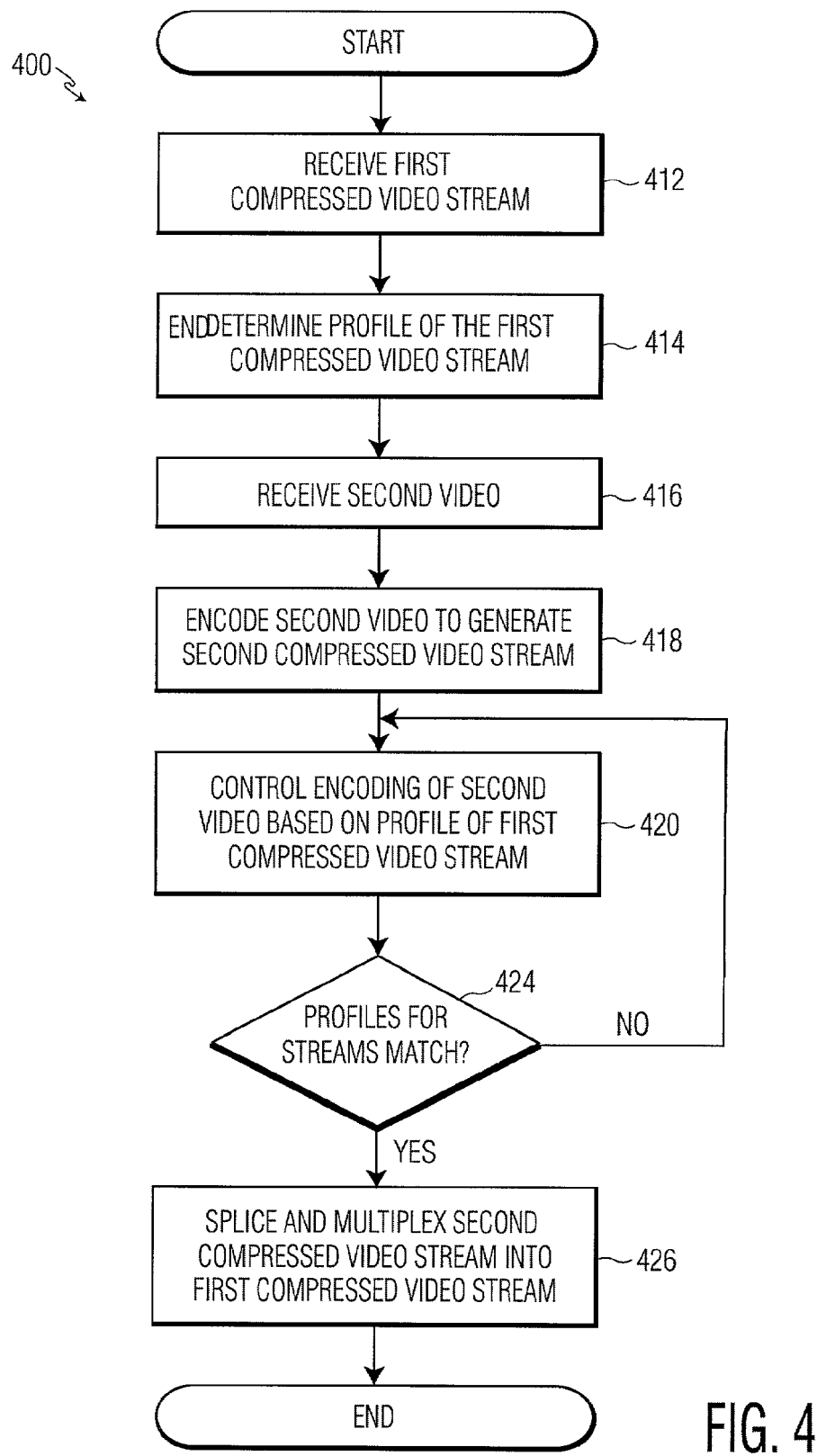
FIG. 4 is a flow diagram of a video insertion process in accordance with an embodiment of the invention.

FIG. 4 is a flow diagram of a video insertion process 400 in accordance with an embodiment of the invention. Video insertion process 400 can be used to insert a second compressed video stream (e.g., for an advertisement) into a first compressed video stream (for a program video). Initially, the first compressed video stream is received, at step 412, and a profile for the stream is determined, at step 414. The profile can include the information described above.

A second video is then received, at step 416, and encoded in accordance with a particular encoding scheme and further based on the profile of the first compressed video stream to generate the second compressed video stream, at step 418. The encoding of the second video is controlled continuously based at least in part on the profile of the first compressed video stream, at step 420. The encoding can be initiated prior to the time the second compressed video stream is needed, and the encoding can be adjusted such that the profiles for the first and second compressed video streams approximately match. If the profiles for the streams do not match (within the requisite degree), the encoding parameters are further adjusted back at step 420. Otherwise, if the profiles approximately match, the second compressed video stream can be spliced and multiplexed into the first compressed video stream, at step 426.

Insertion of Targeted Advertisement to Form a Customized User Interface

Figure 5:
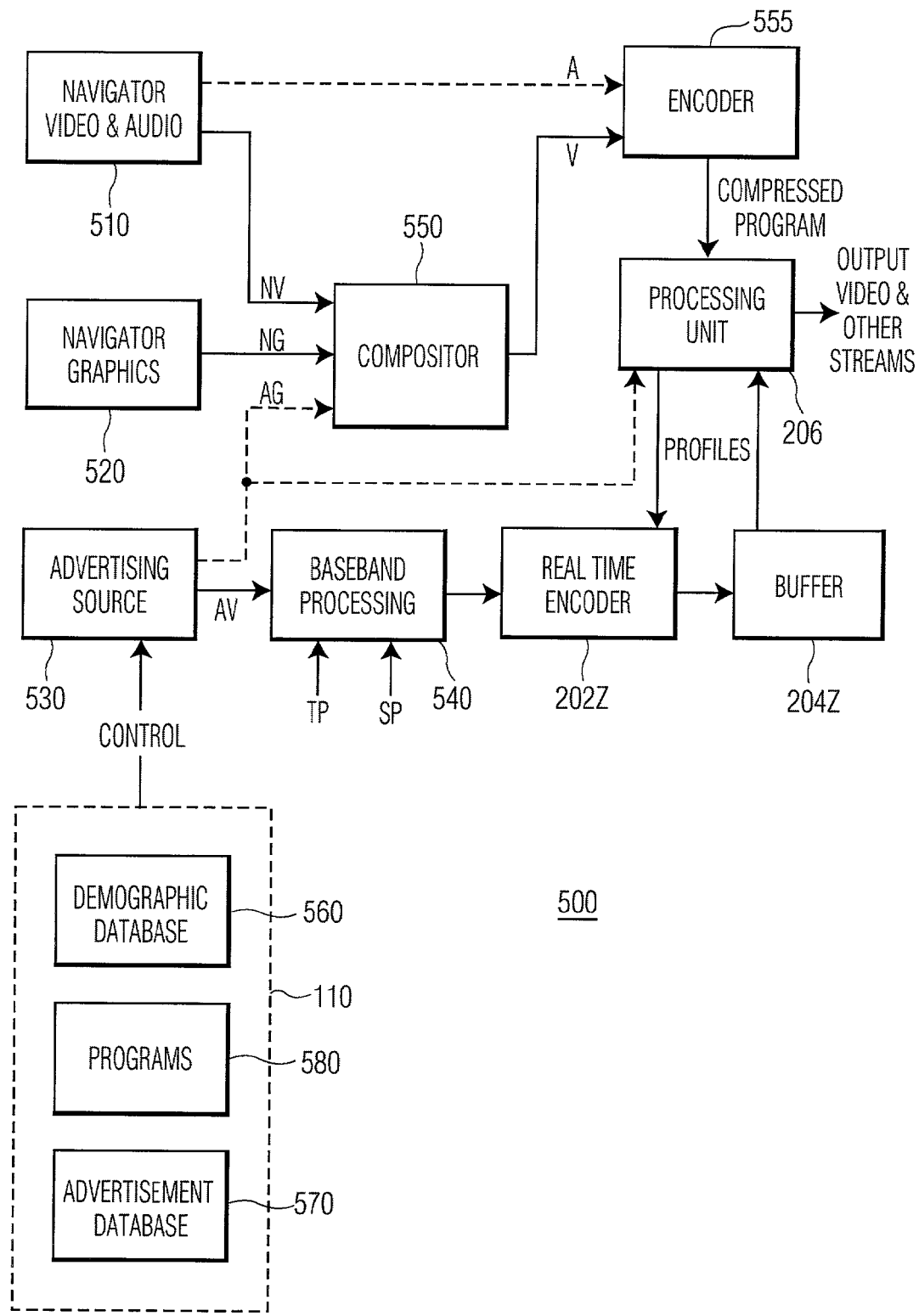
FIG. 5 depicts a block diagram of an alternate embodiment of an ad insertion processor in accordance with an embodiment of the invention.

FIG. 5 depicts a block diagram of an alternate embodiment of an ad insertion processor in accordance with the invention. Specifically, FIG. 5 depicts a block diagram of an embodiment of ad insertion processor 112 suitable for use in service provider equipment, such as depicted above with respect to FIG. 1. In this embodiment, ad insertion 112 includes an advertisement source 530 capable of providing advertising graphics and/or advertising video. The advertising graphics are provided by an advertising graphics stream AG; the advertising videos are provided by an advertising video stream AV. Advertising graphics may comprise, for example, banner advertisements, graphical images or other graphically represented imagery. Advertising video comprises, for example, a video stream providing still or moving imagery.

It will be appreciated by those skilled in the art that while the invention is herein described in terms of the insertion of targeted advertising within a navigator or interactive program guide, the invention has broader applicability. Specifically, while advertising is the most likely form of content to be inserted into a navigator or IPG stream, non-advertising content may also be inserted. Within the context of a customized user interface, the user may have selected the type of content to be supplied. For example, the user may select specific audio tracks and/or video tracks to be provided during the time in which the user interacts with the service provider equipment. Other forms of content may also be supplied to the user either by request or according to a rules-based process.

The ad insertion processor 112 of FIG. 5 differs from the ad insertion processor 112 of FIG. 2 in several important characteristics. First, the ad insertion processor 112 of FIG. 5 is directed towards inserting video and/or graphics advertising into a bitstream used to provide interactive program guide (IPG) or navigator imagery to subscriber equipment 106. The bit stream comprises one or more of a video stream, an audio stream, associated graphics data, associated control data and other forms of data useful or necessary to implement the functionality of the navigator or IPG. With respect to function, IPG or navigator enables a subscriber to manipulate displayed graphical objects to effect thereby the browsing of available content offerings and selection of desired offerings.

A navigator suitable for use in the present invention is described in U.S. Pat. No. 6,208,335 B1 issued Mar. 27, 2001 and incorporated herein by reference in its entirety. An IPG suitable for use in the present invention is described in U.S. patent application Ser. No. 09/359,560 which is incorporated herein by reference in its entirety.

The ad insertion processor 112 of FIG. 5 comprises a navigator video and audio source 510, a navigator graphics source 520, an advertising source 530, a baseband-processing module 540, a compositor 550, a real time encoder $202_z$, a buffer $204_z$ and a processing unit 206. Additionally, several portions of the controller 110 are shown. Specifically, a controller 110, when used in conjunction with the ad insertion processor 112 of FIG. 5, includes a demographic database 560, an advertisement database 570 and various programs 580. The programs 580 include at least those programs necessary to implement the IPG or navigator function, those programs necessary to select which advertisement is appropriate to which user and those programs necessary to cause the appropriate advertising to be inserted or multiplexed into the navigator bitstream(s) provided to the user. While not shown in detail, the controller 110 includes, or cooperates with, various memory, input/output (I/O) and computing or processing resources to effect the control functions described herein. In addition, support circuitry (not shown), such as power supplies, cache memory, interconnection bus structures and the like are used in a known manner to effect the purposes of the controller as described herein.

The demographic database 560 stores information indicative of the demographic profile, viewer habits and/or preferences of each user within a system or, alternatively, those users associated with the subscriber equipment 106 included in a particular household. The demographic database 560 may include individual user data, neighborhood data, region data and the like. Generally speaking, the demographic database 560 stores and processes data relevant to determining the type of content and/or advertising appropriate to particular viewers or groups of viewers as defined by demographic category such as age, region, income bracket and the like, or specified preferences previously indicated by the users.

The selection of advertising is made by matching the demographic criteria of a particular user (stored in demographic database 560) with the available advertisements from the advertising source 530. The available advertisements are indicated within, for example, the advertisement database 570.

The demographic database 560 may be updated (and its data refined) using the techniques disclosed in U.S. patent application Ser. No. 9/737,841, entitled METHOD AND APPARATUS FOR COLLECTING AND REPORTING CONSUMER TREND DATA IN AN INFORMATION DISTRIBUTION SYSTEM, filed Dec. 14, 2000, and incorporated herein by reference in its entirety. Briefly, the disclosed techniques collect data indicative of viewer habits and preferences relating to television viewing and/or the use of a user interface (e.g., an interactive program guide or navigator) provided at a user terminal. Various types of information are collected to identify and track the habits and preferences of the viewers. For example, the specific viewer interactions with the terminal, selections made by the viewer, requests for particular programming, demographic information and other information may be collected from viewers or subscribers within an interactive information system. These various types of information are collectively referred to as "trend" data and demographic data. Based on this trend data the type of advertisement appropriate to a single user, a group of related users, or larger groups of users may be determined.

The advertisement database 570 stores information indicative of the graphic and/or video advertisement stored within the advertisement source 530. By comparing the available advertisements with the demographic profile of a particular user, the programs 580, when executed by the controller 110, cause the advertising source 530 to produce an advertising graphic stream AG or advertising video stream AG for inclusion within an IPG or navigator image intended for the particular viewer or user.

In one embodiment, only an advertisement graphic stream AG is used to provide advertising to the viewer. In this embodiment, the controller 110 causes the advertising source 530 to provide appropriate (to the viewer or user)

advertising content via an advertising graphic stream AG. The advertising graphic stream AG is coupled to the compositor 550.

The compositor 550 operates to composite or combine the navigator video stream NV, the navigator graphics stream NG and the advertising graphic stream AG into a single video stream that is coupled to encoder 555. Encoder 555 may be implemented as an MPEG-2 encoder that generates an MPEG-2 compliant stream.

The advertising graphic stream AG has associated with it window size and window position information that is processed by the compositor such that a resulting video stream produces an image in which the advertising imagery is displayed with a predefined or desirable area having a predefined or desirable position within a display screen, such as discussed in more detail below with respect to FIG. 6.

In a graphics embodiment, the processing unit 206 produces an output video stream comprising only the compressed program produced by encoder 555. The compressed program produced by encoder 555 includes navigator video imagery, navigator graphics and advertising graphics. The navigator video imagery may also be associated with audio information.

In another graphics embodiment, the advertising source 530 provides the advertising graphic stream AG directly to the processing unit 206. In this embodiment, the advertising graphic stream AG has associated with it tags other information that is used by the processing unit 206 to position the graphic imagery according to a display position. Alternatively, the advertising graphic stream AG is coupled directly, or via processing unit 206, to the modulator 114 for transport to the user or viewer. The user or viewer subsequently demodulates the received transport stream and extracts therefrom the advertising graphic stream AG. The set top terminal of the user or viewer utilizes tags or other informational devices indicative of the appropriate location of the conveyed graphic imagery to generate, in a graphics layer associated with a navigator or IPG, the appropriate advertising.

In another embodiment, the advertising source 530 provides an advertising video stream AV to the baseband processing module 540. The baseband processing module 540, in response to a temporal parameter signal TP and a spatial parameter signal SP (produced by, for example, the controller 110) processes the advertising video signal AV in the temporal and spatial domains to produce a video signal adapted to that of the navigator or IPG video signal NV. The temporal parameters are adjusted to ensure that the frame rate of the advertising video signal AV is consistent with that of the navigator video signal NV. The spatial parameters are adjusted to ensure that the amount of data as measured by, for example, scan lines and pixels per line provided by the advertising signal AV is compatible with the amount of data to be displayed within the advertising window allocated within the navigation screen provided to the user or viewer. Optionally, the baseband processing module 540 generates window size and window position data which may be used by the encoder to cause the data to be encoded at the appropriate screen position and size. Alternatively, the window size and position data is predefined or otherwise provided to the processing unit 206, which responsively performs the digital splicing process necessary to "place" the advertising imagery within an appropriate screen or display window.

The baseband-processing module 540 adjusts temporal parameters by adding video frames or deleting video frames from the sequence of video frames forming the advertising video signal AV. In this manner, the frame rate of the signal may be increased or decreased to match the frame rate of the navigator video signal NV. The baseband-processing module 540 adjusts the vertical and/or horizontal spatial parameters of each frame within a sequence of video frames forming the advertising video signal AV. Vertical size is increased or decreased by, respectively, adding or removing lines of video from each frame. Horizontal size is increased or decreased by, respectively, adding or removing pixels within each line of video.

The temporal and spatially processed advertising signal is then coupled to the real-time encoder $202_z$. Real-time encoder $202_z$ receives PROFILE data via a signal provided by the processing unit 206. The real time encoder $202_z$ operates to encode the baseband process video stream provided by the baseband processing module 540 according to the profile data received from the processing unit 206. The real-time encoded advertising video signal produced by the real-time encoder $202_z$ is then coupled to buffer $204_z$ and, subsequently, to processing unit 206. Processing unit 206, real time encoder $202_z$ and buffer $204_z$ operate in substantially the same manner as described above with respect to FIG. 3. That is, the processing unit 206 causes the baseband processed, real-time encoded and buffer advertising video signal to be inserted into the output video stream along with the compressed program video (i.e., the IPG or navigator video). Thus, in this embodiment, advertising video is inserted into the IPG or navigator stream such that a user may view and, optionally, interact with the advertising video to select the advertised product or service.

In one embodiment of the invention, GOP phase skew is managed by the multiplexer function. That is, assuming a common GOP structure wherein a first I-frame is followed by a pre-defined order of B- and P-frames, it is desirable to portion splicing operations in a manner resulting in the first frame of a new video sequence to be displayed comprising an I-frame. Similarly, it is advantageous to ensure that the last frame of a sequence presented prior to switching to another video sequence comprises a B-frame or P-frame. In this manner, buffer overflow conditions at the far end decoder may be avoided or minimized. In this embodiment of the invention, the above-described multiplexer functions are adapted to monitor frame types within the buffer 204 and provided by the pressed program from encoder 555. Appropriate adaptations are made by the processing unit 206 to ensure that accurate splicing occurs.

In one embodiment, the advertising source 530 produces both an advertising graphic stream AG and an advertising video stream AV. Each of the advertising graphic stream AG and advertising video stream AV is processed one at the above-described manners to produce an output video stream including navigator imagery (i.e., navigator video and graphics imagery), advertising graphics and advertising video.

In one embodiment, the advertising graphics and advertising video comprise two locations within an IPG or navigator screen, wherein one or both of the locations represents an object selectable by the user or viewer. In another embodiment, the advertising video and advertising graphic occupy substantially the same screen area within an IPG or navigator screen. In this embodiment, the advertising graphic may obscure or totally hide the imagery within the advertising stream AV. The advertising video hidden by the advertising graphics may be viewed by the user upon selecting the advertising graphic object via user interaction. Alternatively, an obscuring graphic may be provided by the navigator graphics source 520. In either case, user interaction enables the selection and subsequent removal of the obscuring graphic to allow presentation of the advertising video provided thereunder.

In the case of the advertising graphic or advertising video representing a selectable object, user interaction resulting in the selection of the advertising graphic or video object results in a request to retrieve the selected title. In the case of the advertisement representing content available via the Internet, selection of the advertisement object (graphic or video) results in a "click through" handoff of the user from a video on demand IPG/navigation client to a web-browser client. The web-browser client enables the user or viewer to retrieve static or dynamic hypertext markup language (HTML) pages, streaming video and/or audio and other content from the Internet.

In one embodiment, the navigator video stream provided to the user contains two types of "tags" an advertisement tag and one or more splicing tags. The splicing tags indicate splice-in and splice-out points within the navigator stream. A splice-in point represents a point within navigator stream where a new stream (e.g., an advertising stream) may be inserted. A splice-out point represents a point within the navigator stream wherein the inserted stream may be left and the navigator stream may be resumed as the delivered stream. The point at which an MPEG stream may be entered in a substantially seamless manner is the point immediately preceding an I-frame.

Within the context of a banner ad insertion within a navigator screen, the banner ad may comprise a bit-map image inserted into the navigator screen via the advertising graphic stream AG. Optionally, a pre-processing step is performed on the bit-map image to avoid potential problems with a limited color palette in a set-top box. That is, the bit-map image is pre-processed to translate the color of the court to the colors available at the set-top box using the color palette that is appropriate for the screen on which the advertisement or bit-map image is to be placed. The mechanism for identifying the position for a bit-map image advertisement and finding the appropriate bit-map image advertisement is identical to the mechanisms discussed herein with resect to video advertisements.

The banner ad may also comprise still video imagery provided as the advertising video stream AV. Advantageously, by using video imagery the full range of MPEG color and motion processing is available.

It will be noted that while the invention is primarily is described within the context of video encoding and insertion of one video stream into another video stream, those skilled in the art will readily recognize that audio streams associated with the respective encoded video streams are themselves encoded by respective audio encoders. Thus, as shown by the dashed line denoted as A, navigator video and audio source 510 also produced an audio stream A that is coupled to the encoder 555 contemporaneously with the composite video stream V provided by the compositor 550. In this manner, the encoder 555 operates to produce an MPEG-2 encoded audiovisual stream.

Figure 6:
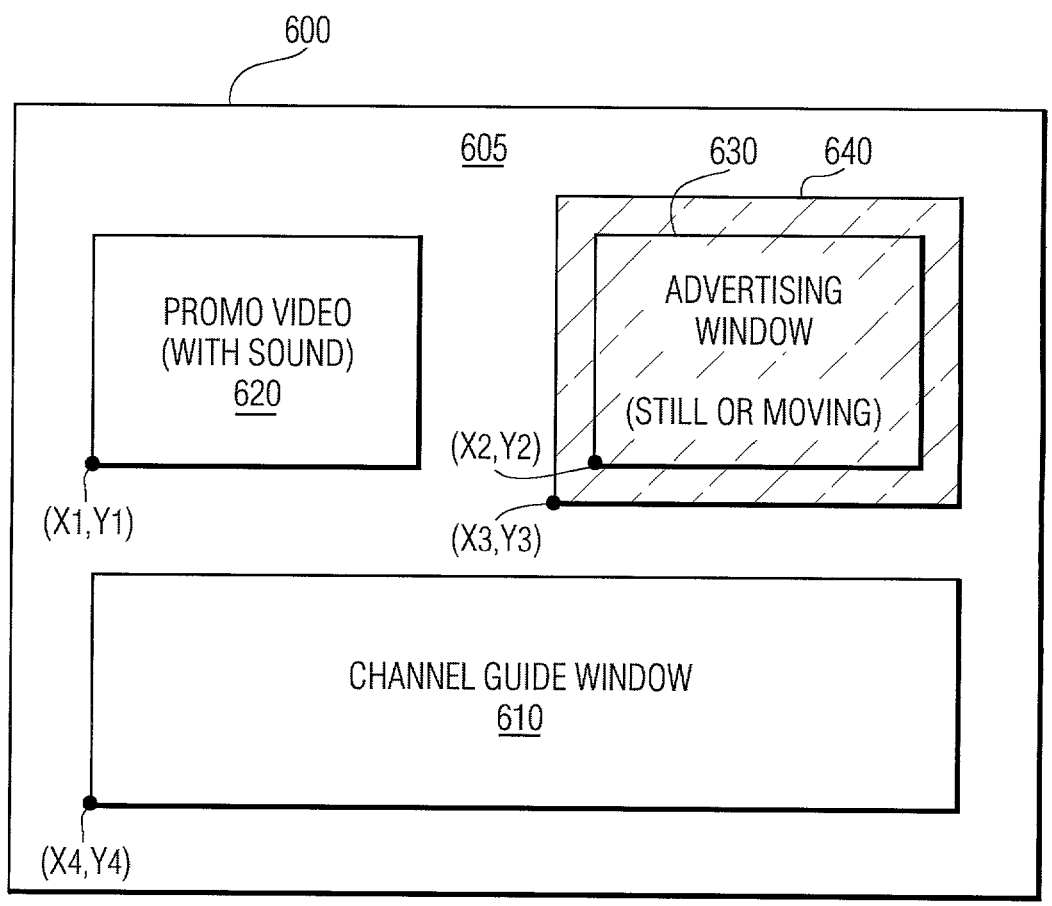
FIG. 6 depicts an exemplary program guide screen adapted according to the present invention.

FIG. 6 depicts an exemplary program guide screen adapted according to the present invention. The program guide screen 600 of FIG. 6 comprises an IPG or navigator screen displayed upon, for example, the display device 118 of subscriber equipment 106.

The program guide screen 600 of FIG. 6 is shown in a simplified or stripped manner as compared with a typical program guide screen. This is done to focus on the particular aspects of the present invention while avoiding a lengthy discussion of the underlying types of imagery associated with an IPG or navigator screen. More detailed navigator or IPG screens are discussed, respectively, in U.S. Pat. No. 6,208,335, U.S. patent application Ser. No. 09/359,560, both of which are incorporated herein by reference in their respective entireties.

The navigator screen 600 of FIG. 6 includes a background 605, a channel guide window 610, an optional promotional video window (with or without sound) 620, an advertising window 630 and an obscuring graphical portion 640.

The imagery depicted in FIG. 6 comprises video layer imagery and graphical layer imagery. With respect to a viewer, graphical layer imagery is above or on top of the video layer imagery, such that changes in graphical layer imagery may fully or partially obscure video layer imagery proximately positioned "underneath".

The background 605, channel guide window 610 and optional promotional video window 620 comprise video layer imagery.

The optional promotional video window 620 may itself comprise the advertising imagery adapted for a particular user. Alternatively, still or moving imagery within the promotional video window 620 may comprise imagery that is broadcast to a larger subscriber population, rather than the customized or "pointcast" imagery to which this disclosure is primarily directed.

The advertising window 630 may include graphical advertising or video advertising. In the case of graphical advertising provided via advertising graphic stream AG to compositor 550, the graphical advertising will be within the video layer. In the case of graphical advertising provided via the advertising video stream AV (or still or moving video imagery provided thereby), the graphical or video imagery will be within the video layer. In the case of graphical advertising provided via a graphics-layer related bitstream coupled directly to the processing unit 206 from the advertising source 530, the graphical advertising will be included within the graphics layer.

The graphical overlay imagery 640 is depicted as obscuring the underlying advertising window imagery (still or moving, graphical or video). The obscuring graphical layer 640 is optional.

It is noted that each of the windows depicted above with respect to the screen 600 of FIG. 6 has associated with it a respective size and position characteristic. The size characteristic may be described in terms of height (scan lines) by width (pixels). The position characteristic may be described in terms of an X, Y coordinate based upon a reference point. For example, in one embodiment the lower left corner of each rectilinear window is offset from the lower left corner of the image screen according to X (horizontal) and Y (vertical) coordinates. Thus, the promo-video window 620 has a position offset of $(X_1, Y_1)$; the advertising window 630 has an offset of $(X_2, Y_2)$; the obscuring graphic window 640 has an offset of $(X_3, Y_3)$; and the channel guide window 610 has an offset of $(X_4, Y_4)$. It will be appreciated by those skilled in the art that other window shapes may be readily employed (e.g., circle) and that other positional offset mechanisms may be readily employed (e.g., angular offsets or offsets from different portions of the screen 600). Generally speaking, the teachings of the present invention may be utilized to insert still or moving advertising imagery using the video insertion and/or graphic insertion techniques described above. The shape or content of the inserted advertising is readily adapted by those skilled in the art.

An interactive menu structure suitable for requesting video-on-demand (VOD) is disclosed in U.S. patent application Ser. No. 08/984,427, entitled METHOD AND APPARATUS FOR PROVIDING A MENU STRUCTURE FOR AN INTERACTIVE INFORMATION DISTRIBUTION SYSTEM, filed Dec. 3, 1997 and incorporated herein by reference in its entirety. Another example of an interactive menu suitable for requesting multimedia services is an interactive program guide disclosed in commonly signed U.S. patent application Ser. No. 09/293,526, entitled DATA STRUCTURE AND METHOD FOR PROVIDING AN INTERACTIVE PROGRAM GUIDE, filed Apr. 15, 1999 and incorporated herein by reference in its entirety.

In a navigator or interactive program guide (IPG) according to various embodiments in the invention, received video sequences may be compressed into one or elementary streams, received audio signals into one or more elementary streams, and program guide or navigator video imagery produced from the guide data (i.e., video imagery produced by compositor 550) may be compressed into one or more elementary streams. The elementary streams can be produced using a number of encoding techniques such as, for example, "picture-based" encoding, "slice-based" encoding, "temporal slice persistence" (TSP) encoding, "strobecast" encoding as well as other types of encoding and/or combinations thereof.

Picture-based encoding is described in detail in U.S. patent application Ser. No. 09/384,394, entitled METHOD AND APPARATUS FOR COMPRESSING VIDEO SEQUENCES, filed Aug. 27, 1999 and incorporated here by reference in its entirety. Slice-based encoding is described in detail in U.S. patent application Ser. No. 09/428,066, entitled METHOD AND APPARATUS FOR TRANSMITTING VIDEO AND GRAPHICS IN COMPRESSED FORM, filed Oct. 27, 1999 and incorporated herein by reference in its entirety. Temporal slice persistence encoding is described in detail in U.S. patent application Ser. No. 09/686,739, entitled TEMPORAL SLICE PERSISTENCE METHOD AND APPARATUS FOR DELIVERY OF INTERACTIVE PROGRAM GUIDE, filed Oct. 10, 2000 and incorporated here by reference in its entirety. Strobecast encoding and delivery is described in detail in U.S. patent application Ser. No. 09/687,662, entitled EFFICIENT DELIVERY OF INTERACTIVE PROGRAM GUIDE USING DEMAND-CAST, filed Oct. 12, 2000. These applications are all assigned to the assignee of the present invention and are incorporated herein by reference in their respective entireties.

Although various embodiments which incorporate the teachings of the present invention have been shown and described in detail herein, those skilled in the art can readily devise many other varied embodiments that still incorporate these teachings.

What is claimed is:

1. A method for delivering customized navigation imagery to a user, comprising:
   determining a first profile associated with an encoded navigation stream, the first profile including spatial and temporal parameters, wherein the spatial parameters of the first profile include vertical and horizontal spatial parameters;
   determining a second profile associated with a video stream, the second profile including spatial and temporal parameters, wherein the spatial parameters of the second profile associated with the video stream include vertical and horizontal spatial parameters;
   determining whether the first profile and the second profile match;
   in response to determination that the first profile and the second profile do not match, adjusting the spatial and temporal parameters of the second profile associated with the video stream in accordance with the first profile of the encoded navigation stream to match the spatial and temporal parameters of the second profile to the spatial and temporal parameters of the first profile;
   encoding the video stream according to the second profile to produce an encoded video stream, the encoded video stream including imagery spliced from the video stream, wherein the imagery is associated with a screen position and an image size, wherein the imagery from the video stream is spliced to the image size using a decimation process;
   incorporating the encoded video stream into a video layer of the encoded navigation stream; and
   providing the encoded navigation stream to the user, wherein a graphical layer is presented contemporaneously with the video layer, wherein presenting the graphical layer results in at least a portion of the video layer being obscured by the graphical layer to produce a customized navigation imagery.

2. The method of claim 1, wherein the first and second profiles define at least one of an encoding rate, encoding resolution, encoding profile and a quantization level.

3. The method of claim 1, wherein the spatial parameters include a frame size parameter and the temporal parameters include a frame rate parameter.

4. The method of claim 1, wherein the encoded navigation stream and the encoded video stream are encoded according to a common group of picture (GOP) data structure, incorporating further comprising:
   aligning the encoded navigation stream and the encoded video stream according to the common GOP data structure.

5. The method of claim 1, wherein the screen position comprises a reference position, incorporating including:
   determining a desired reference screen position for the encoded video stream; and
   translating the screen position of the encoded video stream to the desired reference screen position.

6. The method of claim 1, wherein:
   the graphical layer is provided via graphics data included within an associated graphics data stream.

7. The method of claim 6, wherein:
   the graphics data includes graphical imagery positioned coincident with the screen position, the graphical imagery at least partially obscuring the encoded video stream at the screen position upon presentation.

8. The method of claim 7, further comprising:
   receiving, a user command indicative of selection of the graphical imagery at least partially obscuring the encoded video stream; and
   modifying the graphical imagery at least partially obscuring the encoded video stream to allow user to view the encoded video stream.

9. The method of claim 8, wherein an advertising imagery is determined to be appropriate by comparing at least one of user preference data and usage based profile data to preference data associated with available advertising imagery.

10. The method of claim 1, wherein incorporating further comprises:
    removing data within the encoded navigation stream representing image slices substantially corresponding to the screen position and image size to produce a reduced data encoded navigation stream;

the encoded video stream including data representing image slices corresponding to the screen position and image size.

11. The method of claim 1, wherein incorporating comprises:
removing data within the encoded navigation stream representing image macroblocks substantially corresponding to the screen position and image size to produce a reduced data encoded navigation stream;
the encoded video stream including data representing image macroblocks corresponding to the screen position and image size.

12. The method of claim 1, wherein the step of adjusting further comprises:
adding lines of video to each frame of the video stream to increase a vertical parameter of the second profile to match a vertical parameter of the first profile.

13. The method of claim 1, wherein the step of adjusting further comprises:
removing lines of video from each frame of the video stream to decrease a vertical parameter of the second profile to match a vertical parameter of the first profile.

14. A method for generating a customized user interface, the method comprising:
determining a first profile associated with an encoded navigation stream comprising a video layer and a graphical layer that are operable to for contemporaneous display, the first profile including spatial and temporal parameters, wherein the graphical layer is provided via graphics data included within an associated graphics data stream;
determining a second profile associated with a video stream, the second profile including spatial and temporal parameters;
comparing spatial and temporal parameters of the first profile against the spatial and temporal parameters of the second profile;
in response to determination that the first profile and the second profile do not match, adjusting spatial and temporal parameters of the video stream in accordance with the first profile of the encoded navigation stream to match the spatial and temporal parameters of the second profile to the spatial and temporal parameters of the first profile;
encoding the video stream to produce an encoded video stream, the encoded video stream including imagery associated with a screen position and an image size;
incorporating the encoded video stream into the video layer of the encoded navigation stream; and
providing the encoded navigation stream to the user, wherein the graphical layer is presented contemporaneously with the video layer of the encoded navigation stream, wherein presenting the graphical layer results in at least a portion of the video layer being obscured by the graphical layer to produce the customized user interface.

15. The method of claim 14, wherein:
the graphics data includes graphical imagery positioned coincident with the screen position, the graphical imagery at least partially obscuring the encoded video stream at the screen position upon presentation.

16. The method of claim 15, further comprising:
receiving, a user command indicative of selection of the graphical imagery at least partially obscuring the encoded video stream; and
modifying the obscuring graphical imagery to allow user viewing of the encoded video stream.

17. A method for delivering customized navigation imagery to a user, comprising:
receiving a request from the user for navigation imagery;
retrieving, from a server, the navigation imagery and advertising imagery appropriate for the user;
encoding the retrieved navigation imagery and advertising imagery to produce a encoded navigation stream, the encoded navigation stream comprising a graphical layer representing navigation imagery including advertising imagery appropriate to the user and a video layer, wherein the graphical layer is provided via graphics data included within an associated graphics data stream;
determining a first profile associated with the encoded navigation stream, the first profile including spatial and temporal parameters;
retrieving a video stream associated with a second profile, the second profile including spatial and temporal parameters;
comparing spatial and temporal parameters of the first profile against the spatial and temporal parameters of the second profile to determine whether the first profile and second profile match;
in response to determination that the first profile and the second profile do not match, adjusting the video stream such that the spatial and temporal parameters of the second profile are in accordance with the spatial and temporal parameters of the first profile of the encoded navigation stream to match the spatial and temporal parameters of the second profile to the spatial and temporal parameters of the first profile;
encoding the video stream to produce an encoded video stream, the encoded video stream including imagery associated with a screen position and an image size;
incorporating the encoded video stream into the video layer of the encoded navigation stream; and
providing the encoded navigation stream to the user, wherein the graphical layer is presented contemporaneously with the video layer, wherein presenting the graphical layer results in at least a portion of the video layer being obscured by the graphical layer to produce the customized navigation imagery.

18. The method of claim 17, wherein the advertising imagery is determined to be appropriate by comparing user preference data and preference data associated with available advertising imagery.

19. The method of claim 17, wherein the advertising imagery comprises still imagery.

20. The method of claim 17, wherein:
the graphics data includes graphical imagery positioned coincident with the screen position, the graphical imagery at least partially obscuring the encoded video stream at the screen position upon presentation.

21. The method of claim 20, further comprising:
receiving, a user command indicative of selection of the graphical imagery at least partially obscuring the encoded video stream; and
modifying the obscuring graphical imagery to allow user viewing of the encoded video stream.

* * * * *